US006778784B1

United States Patent
Schrödinger

(10) Patent No.: US 6,778,784 B1
(45) Date of Patent: Aug. 17, 2004

(54) OPTICAL TRANSMISSION DEVICE

(75) Inventor: Karl Schrödinger, Berlin (DE)

(73) Assignee: Infineon Technologies AG, Munich (DE)

( * ) Notice: Subject to any disclaimer, the term of this patent is extended or adjusted under 35 U.S.C. 154(b) by 582 days.

(21) Appl. No.: 09/599,770

(22) Filed: Jun. 22, 2000

(30) Foreign Application Priority Data

Jun. 22, 1999 (DE) .......................................... 199 29 571

(51) Int. Cl.[7] .......................................... H04B 10/04
(52) U.S. Cl. ....................................................... 398/197
(58) Field of Search ................................... 398/94, 197

(56) References Cited

U.S. PATENT DOCUMENTS

| 4,903,273 | A | | 2/1990 | Bathe .......................... 372/38 |
| 5,450,212 | A | * | 9/1995 | Asada ........................ 358/3.02 |
| 5,506,716 | A | * | 4/1996 | Mihara et al. .............. 398/137 |
| 5,526,164 | A | | 6/1996 | Link et al. |
| 6,219,165 | B1 | * | 4/2001 | Ota et al. .................... 398/197 |

FOREIGN PATENT DOCUMENTS

| DE | 37 05 698 A1 | 9/1987 |
| DE | 37 06 572 A1 | 9/1988 |
| DE | 43 16 811 A1 | 11/1994 |
| EP | 0 507 213 A2 | 10/1992 |
| WO | WO 93/13576 | 7/1993 |

\* cited by examiner

*Primary Examiner*—Leslie Pascal
(74) *Attorney, Agent, or Firm*—Laurence A. Greenberg; Werner H. Stemer; Gregory L. Mayback

(57) ABSTRACT

The transmission device comprises at least one laser transmitter (1) which emits light (2) as a function of binary data signals (24) which are to be transmitted, and a monitor receiver (4) which receives part of the emitted light (2) and converts it to a monitor current ($I_{MON}$). A control circuit regulates the mean optical output power ($P_{opt}$) of the laser transmitter to a constant value on the basis of a DC prescribed value (VDC) by evaluating the monitor current ($I_{MON}$), the prescribed value (VDC) being obtained by tuning and being permanently stored in a read only memory (FSP) in the course of the tuning.

12 Claims, 2 Drawing Sheets

OPTICAL TRANSMISSION DEVICE

BACKGROUND OF THE INVENTION

Field of the Invention

The invention applies to the field of optical data transmission using an optical transmission device which generates corresponding optical pulses when electrical data pulses are applied to it. The optical pulses can be transported to a receiver, for example using at least one optical transmission medium (e.g. an optical fiber) connected to the transmission device. The invention is aimed at an optical transmission device having at least one laser transmitter, whose operating point is regulated on the basis of a prescribed value.

WO 93/13576 discloses a transmission device having a plurality of laser diodes which can be electrically driven individually for the purpose of optical data transmission. The individual laser diodes are driven by a total current which is composed of a current (alternating current $I_{AC}$) which is modulated on the basis of the (binary) data to be transmitted, and a direct current ($I_{DC}$). The direct current is used for setting the mean optical output power (also called target power) and defines the operating point of the respective laser diode. The transmission device has a control loop which regulates the output power of all the laser diodes together such that the target power of the individual laser diodes is kept as constant as possible, for example by compensating for temperature-related fluctuations in their optical characteristics.

EP 0 507 213 A1 discloses a transmission device having a laser transmitter which emits light as a function of binary data signals at the input. A monitor receiver converts part of the emitted light to a monitor current. A control circuit regulates the mean optical output power of the laser transmitter to a constant value by evaluating the monitor current on the basis of a reference current provided by a reference current source. The specific way in which the magnitude of the reference current is determined is not explained in more detail.

However, significant differences in the optical behavior of individual laser transmitters mean that, during production of optical transmission devices having laser transmitters, tuning is necessary so that the laser transmitters have approximately the same optical properties. In this regard, it is conceivable for an analog control circuit to be used to vary the operating point of the laser transmitters using resistor decades or variable resistors (potentiometers). Subsequently, the resistor dimensioned in this manner for an optimum operating point can be soldered into the respective control circuit. This is relatively time consuming; furthermore, the laser transmitter needs to be gauged again for checking purposes after tuning effected in this manner.

SUMMARY OF THE INVENTION

The object of the invention is to create a transmission device which permits its optical properties to be tuned rapidly, permanently and with little effort.

This object is achieved by an optical transmission device having at least one laser transmitter which emits light as a function of data signals to be transmitted, having a monitor receiver which receives part of the emitted light and converts it to a monitor current, having a control circuit which regulates the mean optical output power of the laser transmitter to a constant value on the basis of a DC prescribed value by evaluating the monitor current, the DC prescribed value being obtained by tuning, and having a read only memory which permanently stores the prescribed value in the course of the tuning and supplies the prescribed value to the control circuit.

An essential aspect of the invention is thus that the DC prescribed values determined in a tuning operation—which is preferably carried out immediately after production has finished, while still at the factory—are written to a memory as nonvolatile values. This read only memory supplies the prescribed values to suitable circuits which, on the basis of these prescribed values, generate a direct current, which is to be prescribed in each case, and apply it to the input of the control circuit. Hence, there is advantageously no need to provide or introduce separate resistors for the purpose of providing prescribable direct currents. The tuning operation can thus be significantly shortened since the final test can take place together with the tuning.

Advantageously, the DC prescribed value can represent at least one DC variable relevant to the operating behavior of the transmission device (namely the threshold current or the modulation direct current), said DC variable being applied to the input of the control circuit which regulates the optical output power of the laser transmitter to a constant value by evaluating the monitor current. In this context, the threshold current (also called $I_{TH}$) is the minimum current which needs to flow for a laser to reach the laser state and emit laser pulses. The modulation direct current is used to set the modulation swing for generating the (binary) light or laser signals. In accordance with preferred refinements based on the invention, the threshold current or the modulation direct current can be fed into the laser transmitter on the basis of a further prescribed value (for the threshold current or the modulation direct current) using a controller. The DC prescribed value determines the mean optical output power in the case of this refinement of the invention too; in this context, the threshold current or the modulation direct current is the regulated current, while the other current in each case is controlled. Advantageously, the respective further prescribed value is also permanently stored in a non-volatile memory in the course of the tuning.

As a preference, a temperature compensation current can also be generated. This is produced on the basis of a further prescribed value which is obtained during the tuning or can be known previously and is permanently written in the non-volatile memory. The temperature compensation current can be used to compensate for the influence of temperature variations sensed by a temperature sensor, for example, on the controlled threshold current or the modulation direct current.

In one refinement of the invention which is preferred in design terms and with regard to the miniaturization of transmission devices, the memory is a component part of an integrated circuit which also contains circuits or circuit parts for driving the laser transmitter and/or regulating the mean optical output power of the laser transmitter.

Illustrative embodiments of the invention are explained further below with the aid of a drawing, in which:

DESCRIPTION OF THE PREFERRED EMBODIMENT

Figure 1:
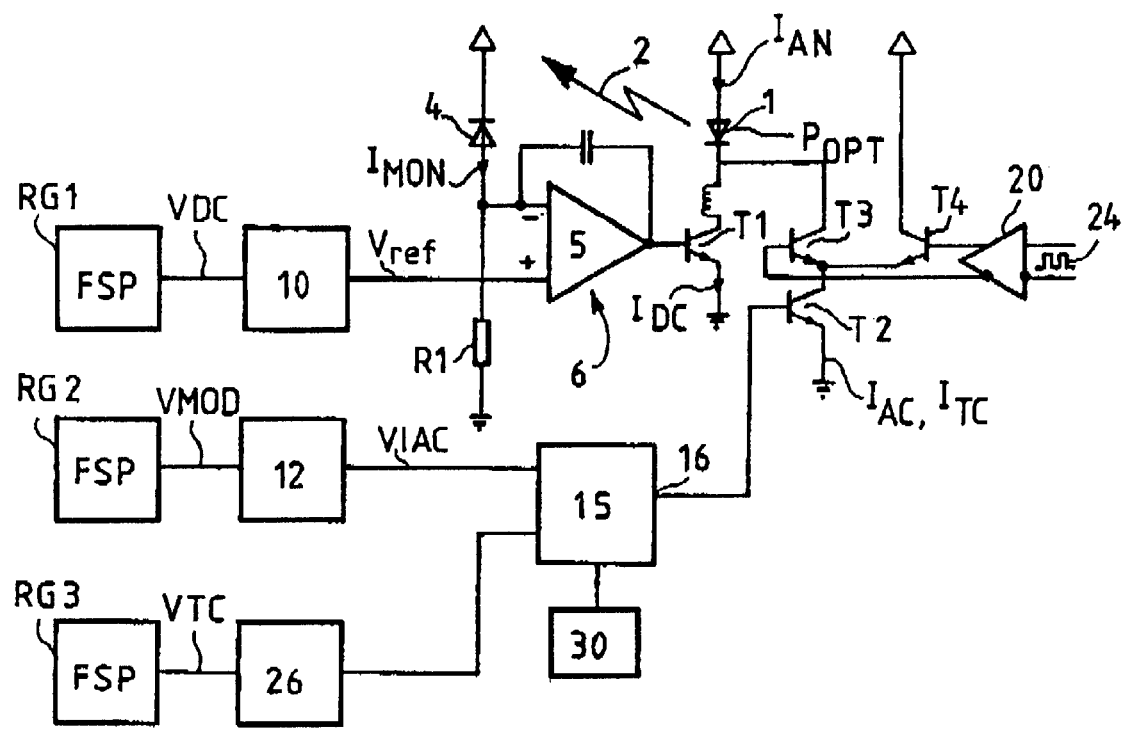
FIG. 1 shows a first transmission device according to the invention.

FIG. 1 shows a transmission device having a laser transmitter 1 which, when a drive current $I_{AN}$ is applied to it in an appropriate manner, outputs light pulses 2 which can be input into an optical fiber, for example. A portion of the emitted light reaches a photodiode 4 which has the function of a monitor diode and generates a monitor current $I_{MON}$. The feedback via the monitor diode 4, or its monitor current $I_{MON}$, allows a voltage corresponding to the actual value of the mean optical output power $P_{opt}$ to drop across a resistor R1. The voltage is applied to the input (−) of the differential amplifier 5, which is a component part of a control loop 6 for regulating the mean optical output power $P_{opt}$ of the laser transmitter 1 to a constant value. The other input (+) of the differential amplifier 5 has a reference voltage $V_{ref}$ applied to it. The output signal from the amplifier 5 determines the on-state level of a transistor T1. The reference voltage $V_{ref}$ prescribes the mean optical output power $P_{opt}$ of the laser transmitter 1 at the desired operating point (nominal value) and provides for appropriate regulation of a threshold current $I_{DC}$.

The reference voltage $V_{ref}$ is the output signal from a digital/analog converter 10 whose input has a prescribed value VDC applied to it. The prescribed value VDC thus determines the reference voltage $V_{ref}$. The prescribed value comprises an 8 bit long value, for example, which is written to an 8 bit register RG1 in a non-volatile memory FSP.

A further prescribed value VMOD is permanently written to a further 8 bit register RG2 in the non-volatile memory FSP. This further prescribed value VMOD is also converted, by means of a digital/analog converter 12, to an analog signal VIAC which is supplied to the input of a controller 15 for a modulation direct current $I_{AC}$. The output 16 of the controller 15 is connected to the base of a further transistor T2, which forms a current path 17 with a transistor T3. The current path 17 is connected to the cathode of the laser transmitter 1 in the form of a laser diode. This means that a further current (namely the modulation direct current $I_{AC}$), generated on the basis of the prescribed value VMOD, is fed into the laser transmitter 1. The bases of the transistors T3 and T4 are connected, in a manner which is known per se, to a differential amplifier 20 whose inputs are supplied with electrical drive signals (data) 24 provided for conversion to optical signals.

In the same way, a further current—namely a temperature compensation current $I_{TC}$—is generated by the controller 15 and is fed via the transistor T2 into the flow of current through the laser transmitter 1. The temperature compensation current $I_{TC}$ is also formed on the basis of a prescribed value VTC. The current $I_{TC}$ serves to compensate for any temperature fluctuations in the laser parameters regarding the modulation direct current $I_{AC}$. The prescribed value VTC is supplied to a further digital/analog converter 26 as an 8 bit long value and is permanently stored in a third register RG3 in the read only memory FSP. Hence, interaction with a temperature sensor 30 produces inherently known temperature compensation whose influence can be set by the prescribed value VTC.

The total drive current $I_{AN}$ flowing through the laser transmitter 1 during operation thus comprises the threshold current $I_{DC}$ and also the modulation direct current $I_{AC}$ and the temperature compensation current $I_{TC}$, which are modulated by the transistors T3, T4 (current switches) on the basis of the data 24 which is to be transmitted.

The prescribed values VDC, VMOD, VTC written in the registers RG1, RG2, RG3 are determined as part of a tuning operation (explained in even more detail below) for the transmission device and are permanently written to the registers at that time.

Figure 2:
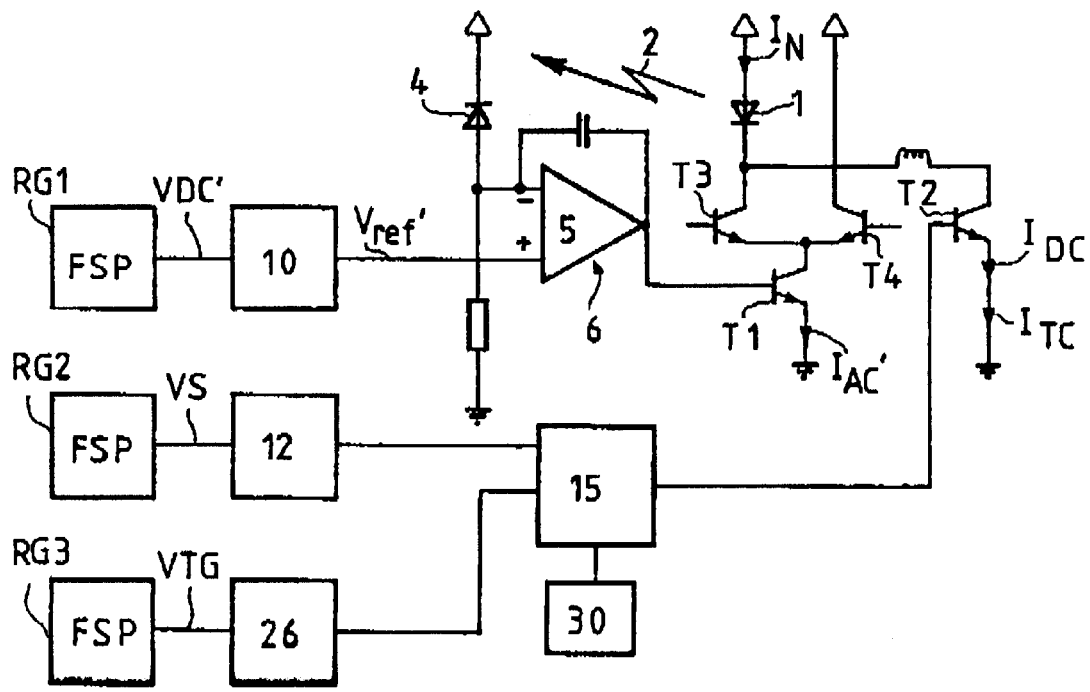
FIG. 2 shows a second transmission device according to the invention.

FIG. 2 shows a transmission device of similar design to that shown in FIG. 1, with corresponding elements being denoted by the same reference symbols. For reasons of simpler illustration, the fact that the bases of the transistors T3 and T4 have the electrical data pulses (24 cf. FIG. 1) to be transmitted applied to them is not shown.

In the case of this illustrative embodiment too, the feedback via the monitor diode 4, or its monitor current $I_{MON}$, allows an actual value for the mean optical output power $P_{opt}$ to drop across the resistor R1 as a voltage at the input (−) of the differential amplifier 5. The other input (+) of the differential amplifier 5 in turn has a reference voltage $V_{ref}'$ applied to it which determines the on-state level of the transistor T1. The reference voltage $V_{ref}'$ prescribes the mean optical output power $P_{opt}$ of the laser transmitter 1 at the desired operating point (nominal value) on the basis of a prescribed value VDC'. Unlike in the illustrative embodiment shown in FIG. 1, however, regulation is carried out by correcting the modulation direct current $I_{AC}'$ by means of appropriate control of the on-state level of the transistor T1. Thus, in this second illustrative embodiment, the reference voltage $V_{ref}'$ provides for appropriate regulation using the modulation direct current $I_{AC}'$.

A further prescribed value VS for the threshold current $I_{DC}$ is supplied to the input of the digital/analog converter 12. The output of the latter is connected to a controller 15 which controls the current $I_{DC}$, corresponding to the threshold current prescribed value VS, in the laser transmitter 1 using the transistor T2. The further prescribed value VS is permanently stored in the register RG2 in the read only memory FSP in the course of tuning.

In the same way as explained above, a further current (namely a temperature compensation current $I_{TC}$), generated on the basis of a prescribed value VTC, can be fed into the laser transmitter 1 via the transistor T2 by the controller 15. The prescribed value VTC is supplied to the digital/analog converter 26 as an 8 bit long value and is permanently stored in the third register RG3 in the memory FSP. Hence, interaction with a temperature sensor 30 produces inherently known temperature compensation whose influence can be set by the prescribed value VTC.

As shown in FIG. 2, the output signals from the controller 15 are passed to the base of the transistor T2, which uses them to control the direct currents flowing through the laser transmitter 1. The total drive current $I_{AN}$ flowing through the laser transmitter 1 during operation is thus composed of the modulation direct current $I_{AC}$ and also of the threshold current $I_{DC}$ and the temperature compensation current $I_{TC}$, which are modulated by the transistors T3, T4 (current switches) on the basis of the data which is to be transmitted.

The read only memory FSP is preferably a component part of an integrated circuit which also contains the driver circuit, e.g. with the transistors T1 to T5, for driving the laser transmitter 1, and the control circuit 6 for regulating the optical output power of the laser transmitter 1.

The obtainment and storage of the prescribed values VDC, VMOD and VDC', VS (FIG. 2) are explained below by way of example in conjunction with FIG. 3. When the appropriate prescribed values are determined in practice, the prescribed value for the mean optical output power $P_{opt}$ of the laser transmitter is preferably determined first. For this purpose, the output power input into a transmission optical fiber during continuous emission is measured (e.g. at the other end of the optical fiber) first, for example, and the operating point of the laser transmitter is (temporarily) set (by means of an appropriate prescribed value VDC) such that the desired output power is obtained.

In a second step, the modulation direct current is used to set the modulation swing such that as large a swing as possible is assured for undistorted light signals. During the operation of the illustrative embodiment shown in FIG. 2, the modulation direct current $I_{AC}'$ forms a component of the total drive current through the laser transmitter, which is regulated by means of the output power controller.

Specifically, a DC prescribed value which has been found to lie in the operating range of the laser transmitter 1 and which gives rise to a direct current $I^*_{DC}$ is selected first during tuning. Hence, an operating point AP* is defined on the characteristic curve KL of the laser transmitter. In FIG. 3, $I_{TH}$ denotes the threshold current, $I_{AN}$ denotes the total drive current and $P_z$ denotes the desired optical output power (target power).

By varying the prescribed value VDC, the direct current $I_{DC}$ is subsequently changed until the desired target value $P_z$ for the optical power (operating point AP) is produced (the emitted light is initially constant in this case on account of exclusively driving with a direct current ("constant light")). The modulation range of the transmission device is then tuned by appropriately controlling the transistor T2 (FIG. 1). As FIG. 3 shows, a first modulation current $I1_{AC}$ is used to start with, said modulation current generating a first corresponding output signal S1 having the optical power $P_o$ shown. Increasing the modulation current to a value $I3_{AC}$ increases the modulation swing or modulation range in line with the output signal S3 shown at that instant, the operating point AP remaining constant.

Figure 3:
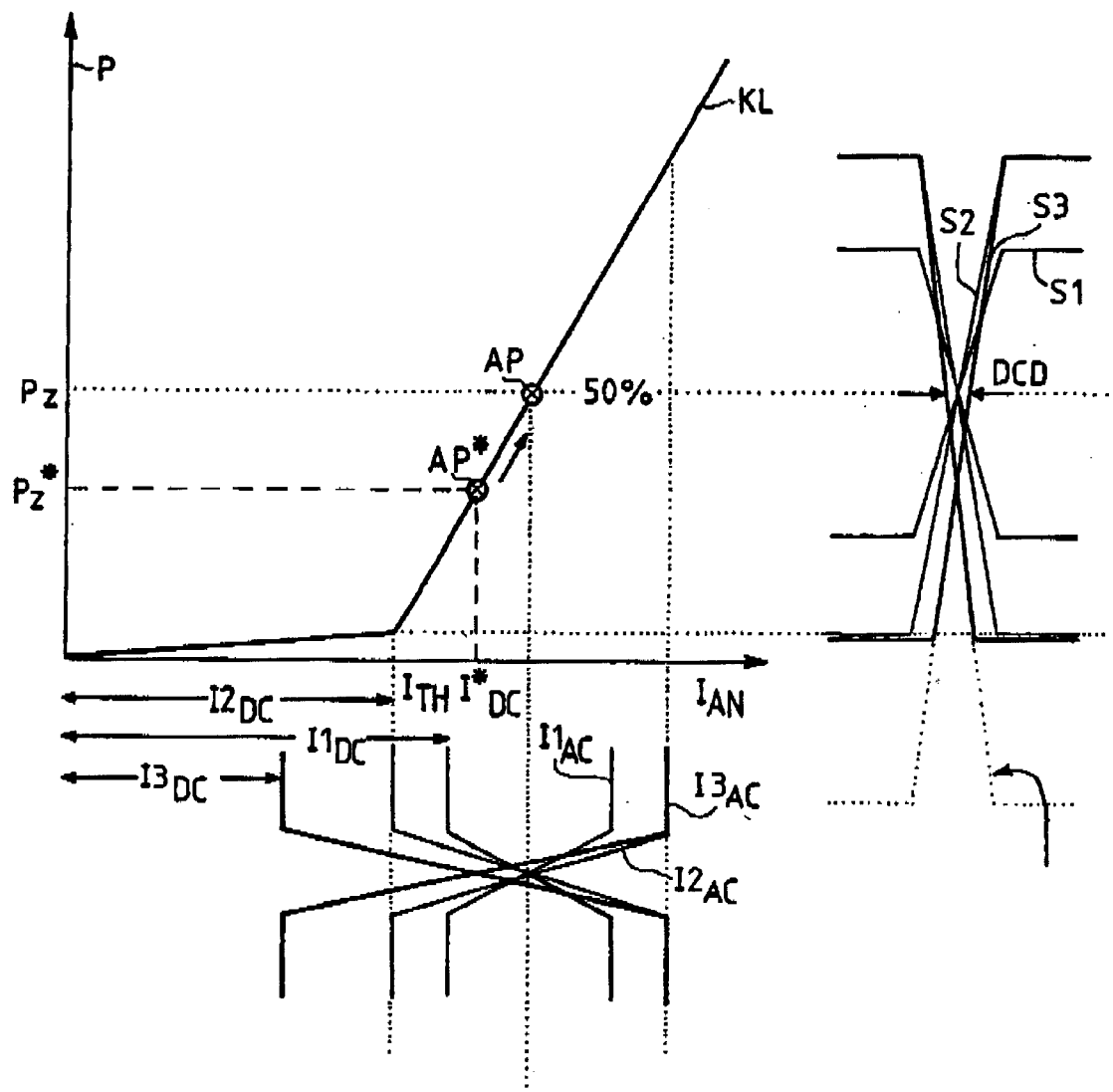
FIG. 3 shows characteristic curves to explain the functional relationships and the tuning of the transmission devices.

As shown on the right-hand side of FIG. 3, the threshold current $I_{TH}$ is overmodulated in this case; this causes signal distortion because the lower range of the signal S3 is clipped on account of the characteristic curve KL. The characteristic quantity used for this is the so-called duty cycle distortion DCD, which denotes the pulse distortion caused by clipped pulses. The aim is for DCD=0. In the case of signal S3, DCD>0 (distortion caused by clipped pulse components in the lower pulse range).

The modulation current is varied until the current which produces an optimum signal S2 is found, said current being denoted by $I2_{AC}$ in FIG. 3.

The prescribed values for the (optimized) modulation current $I2_{AC}$ and the direct current are permanently written, as mentioned, directly to the register in the electronic memory FSP as digital prescribed values VDC, VMOD.

I claim:

1. An optical transmission device, comprising:
   at least one laser transmitter configured to emit light in dependence on data signals to be transmitted;
   a monitor receiver for receiving a portion of the emitted light and for converting the light to a monitor current;
   a control circuit connected to and regulating a mean optical output power of said laser transmitter to a constant value on the basis of a DC prescribed value by evaluating the monitor current, wherein the prescribed value is obtained by tuning; and
   a non-volatile memory configured to permanently store the prescribed value in the course of the tuning and to supply the prescribed value to said control circuit.

2. The transmission device according to claim 1, which further comprises:
   a controller connected to said laser transmitter, said controller receiving a further prescribed value for a modulation current and feeding a current corresponding to the modulation current prescribed value into said laser transmitter; and
   wherein the further prescribed value is permanently stored in said non-volatile memory during the tuning.

3. The transmission device according to claim 1, which further comprises:
   a controller connected to said laser transmitter, said controller receiving a further prescribed value for a threshold current and feeding a current corresponding to the threshold current prescribed value into said laser transmitter; and
   wherein the further prescribed value is permanently stored in said non-volatile memory during the tuning.

4. The transmission device according to claim 2, wherein said laser transmitter receives a temperature compensation current having a magnitude determined by a further prescribed value obtained by tuning and permanently stored in said non-volatile memory.

5. The transmission device according to claim 3, wherein said laser transmitter receives a temperature compensation current having a magnitude determined by a further prescribed value obtained by tuning and permanently stored in said non-volatile memory.

6. The transmission device according to claim 1, wherein said non-volatile memory is a component part of an integrated circuit which also contains circuits or circuit parts for at least one of driving said laser transmitter and regulating the mean optical output power of said laser transmitter.

7. An optical transmission device, comprising:
   at least one laser transmitter configured to emit light in dependence on data signals to be transmitted;
   a monitor receiver for receiving a portion of the emitted light and for converting the light to a monitor current;
   a control circuit connected to and regulating a mean optical output power of said laser transmitter to a constant value on the basis of a prescribed threshold current value by evaluating the monitor current, wherein the prescribed value is obtained by tuning;
   a non-volatile memory configured to permanently store the prescribed threshold current value in the course of the tuning and to supply the prescribed value to said control circuit;
   a controller connected to said laser transmitter, said controller receiving a further prescribed value for a modulation current and feeding a current corresponding to the prescribed value for the modulation current into said laser transmitter; and
   wherein the further prescribed value is permanently stored in said non-volatile memory during the tuning.

8. The transmission device according to claim 7, wherein said laser transmitter is connected to receive a temperature compensation current generated by said controller for compensating a temperature dependency of the modulation current, the temperature compensation current having a magnitude determined by a further prescribed value obtained by tuning and permanently stored in said non-volatile memory.

9. The transmission device according to claim 7, wherein said non-volatile memory is a component part of an integrated circuit which also contains circuits or circuit parts for at least one of driving said laser transmitter and regulating the mean optical output power of said laser transmitter.

10. An optical transmission device, comprising:

at least one laser transmitter configured to emit light in dependence on data signals to be transmitted;

a monitor receiver for receiving a portion of the emitted light and for converting the light to a monitor current;

a control circuit connected to and regulating a mean optical output power of said laser transmitter to a constant value on the basis of a prescribed value for a modulation current by evaluating the monitor current, wherein the prescribed value is obtained by tuning;

a non-volatile memory configured to permanently store the prescribed value for the modulation current in the course of the tuning and to supply the prescribed value to said control circuit;

a controller connected to said laser transmitter, said controller receiving a further prescribed value for a threshold current and feeding a current corresponding to the prescribed value for the threshold current into said laser transmitter; and wherein the further prescribed value for the threshold current is permanently stored in said non-volatile memory during the tuning.

11. The transmission device according to claim 10, wherein said laser transmitter is connected to receive a temperature compensation current generated by said controller for compensating a temperature dependence of the threshold current, the temperature compensation current having a magnitude determined by a further prescribed value obtained by tuning and permanently stored in said memory.

12. The transmission device according to claim 10, wherein said memory is a component part of an integrated circuit which also contains circuits or circuit parts for at least one of driving said laser transmitter and regulating the mean optical output power of said laser transmitter.

\* \* \* \* \*